(12) United States Patent
Chiu et al.

(10) Patent No.: US 9,894,528 B2
(45) Date of Patent: Feb. 13, 2018

(54) METHODS AND SYSTEMS FOR ALMOST BLANK SUBFRAME (ABS) PATTERN SELECTION FOR SMALL CELLS

(71) Applicant: Avago Technologies General IP (Singapore) Pte. Ltd, Singapore (SG)

(72) Inventors: Fu-Hsuan Chiu, Berkeley Heights, NJ (US); Guosen Yue, Edison, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 143 days.

(21) Appl. No.: 14/926,237

(22) Filed: Oct. 29, 2015

(65) Prior Publication Data

US 2017/0048872 A1 Feb. 16, 2017

Related U.S. Application Data

(60) Provisional application No. 62/205,615, filed on Aug. 14, 2015.

(51) Int. Cl.
*H04W 4/00* (2009.01)
*H04W 16/02* (2009.01)
(52) U.S. Cl.
CPC .................................. *H04W 16/02* (2013.01)
(58) Field of Classification Search
CPC ...................................................... H04W 16/02

USPC ......................................................... 370/329
See application file for complete search history.

(56) References Cited

U.S. PATENT DOCUMENTS

| | | | |
|---|---|---|---|
| 2013/0194950 A1* | 8/2013 | Haghighat | H04W 24/02 370/252 |
| 2014/0044059 A1* | 2/2014 | Hirata | H04W 72/0446 370/329 |
| 2016/0192339 A1* | 6/2016 | Axmon | H04W 24/10 370/329 |

* cited by examiner

*Primary Examiner* — Christopher R Crompton
(74) *Attorney, Agent, or Firm* — Sterne, Kessler, Goldstein & Fox P.L.L.C.

(57) ABSTRACT

Embodiments provide systems and methods for selecting almost-blank sub-frames (ABSs) in wireless networks. ABSs may be utilized as part of enhanced inter-cell interference cancellation (eICIC). In an embodiment, an ABS pattern is selected in a distributed fashion without use of a direct interface between neighboring base stations. Embodiments operate with a hybrid self-organizing network (SON) that includes a centralized self-organizing network (cSON) unit and a distributed self-organizing network (dSON) unit. The cSON may provide the dSON with information about a plurality of ABS patterns, and the dSON may utilize the information received from the cSON to select an ABS pattern from the plurality of ABS patterns. In some embodiments, a base station may select neighboring base stations to perform eICIC based on a reference signal received power (RSRP).

20 Claims, 8 Drawing Sheets

| Pattern # | Pattern Bitmapping |
|---|---|
| 0 | 11000000 |
| 1 | 00110000 |
| 2 | 00001100 |

FIG. 5

| PCI mod r | Pattern # |
|---|---|
| 0 | 0 |
| 1 | 1 |
| ... | ... |
| r-1 | r-1 |

| PCI mod r | Pattern Bitmapping |
|---|---|
| 0 | 10000000 |
| 1 | 01000000 |
| 2 | 00100000 |

| PCI mod r | Pattern Bitmapping |
|---|---|
| 0 | 000111000000 |
| 1 | 000000111000 |
| 2 | 000000000111 |
| 3 | 111000000000 |

FIG. 8

METHODS AND SYSTEMS FOR ALMOST BLANK SUBFRAME (ABS) PATTERN SELECTION FOR SMALL CELLS

CROSS REFERENCE TO RELATED APPLICATIONS

This application claims the benefit of U.S. Provisional Application No. 62/205,615, filed Aug. 14, 2015, which is incorporated herein by reference in its entirety.

TECHNICAL FIELD

Certain embodiments relate to wireless communications. More specifically, certain embodiments relate to methods and systems for almost blank subframe (ABS) pattern selection for small cells.

BACKGROUND

A conventional cellular network is deployed as a homogenous network of macrocell base stations. The macrocell base stations may all have similar antenna patterns and similar high-level transmit powers. To accommodate increases in data traffic, more macrocell base stations can be deployed in a homogenous network, but such a solution is often unattractive due to increased inter-cell interference on the downlink and due to the high costs associated with site acquisition for newly deployed macrocell base stations.

Because of these drawbacks, cellular network operators are turning to heterogeneous networks to meet the demands of increased data traffic. In heterogeneous networks, small cell base stations are used to provide small coverage areas that overlap with the comparatively larger coverage areas provided by macrocell base stations. The small coverage areas are specifically provided in areas with high data traffic (or so called hotspots) to increase capacity. Examples of small cell base stations include, in order of decreasing coverage area, microcell base stations, picocell base stations, and femtocell base stations or home base stations. Small cells deployments result in more base stations that are closer to the mobile devices they serve. The increased network capacity of small cells make them a promising solution to deliver 5G throughput.

Some modern cellular standards, such as the $3^{rd}$ Generation Partnership Project (3GPP) Long Term Evolution (LTE), employ single frequency reuse (SFR), where each cell in the network operates on the same frequency. Interference management can be a problem in small cell deployments on SFR networks due to proximity of the cells. For example, small cells can be deployed in adjacent rooms of a building. In such a scenario, the signals emitted from a base station may penetrate into an adjacent cell, causing inter-cell interference to receivers in the adjacent cell.

To address inter-cell interference in small cell deployments, the 3GPP Working Group developed enhanced inter-cell interference coordination (eICIC), which enables time-domain coordination between base stations where dominating interfering cells are present. In eICIC, adjacent base stations coordinate to occasionally transmit an almost blank subframe (ABS). This coordination typically requires real-time communication between the base stations via a high-speed X2 interface. It would therefore be beneficial to enable eICIC with minimal or no real-time coordination between base stations.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure. Generally, the drawing in which an element first appears is typically indicated by the leftmost digit(s) in the corresponding reference number.

FIG. 5 illustrates an exemplary list of ABS patterns.

FIG. 6 illustrates an exemplary mapping of a base station's PCI to an ABS pattern number.

FIG. 7 illustrates an exemplary list of ABS patterns that may be generated directly from ABS parameters.

FIG. 8 illustrates a further exemplary list of ABS patterns that may be generated directly from ABS parameters.

DETAILED DESCRIPTION OF EMBODIMENTS

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
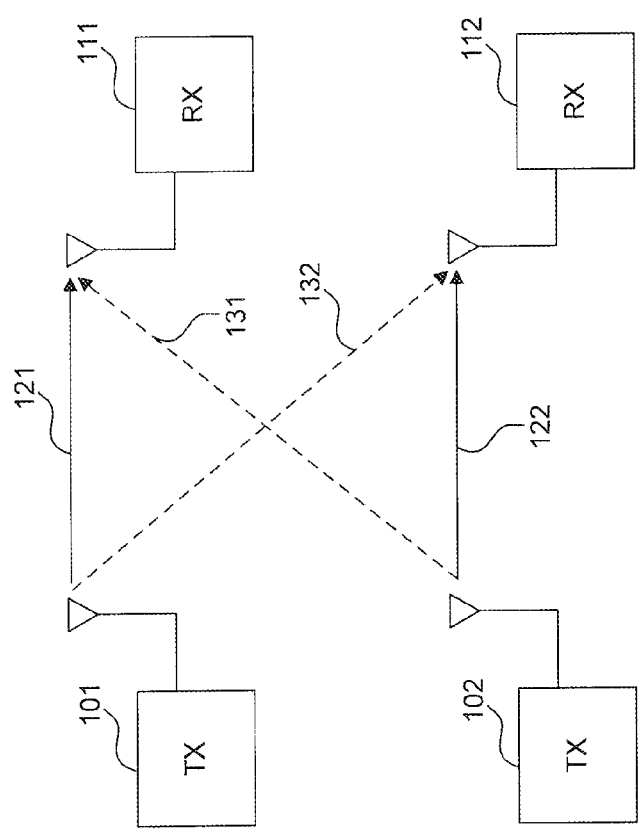
FIG. 1 illustrates an exemplary wireless communications network with two transmitters and two receivers.

FIG. 1 illustrates a block diagram of an exemplary wireless communications network with two transmitters and two receivers. In this network, transmitter 101 communicates data to receiver 111 via wireless link 121. Similarly, transmitter 102 communicates data to receiver 112 via wireless link 122. In an embodiment, the transmissions from transmitters 101 and 102 are on the same carrier frequency. Transmissions from transmitter 101 interfere with receiver 112 via interfering link 132, and transmissions from transmitter 102 interfere with receiver 111 via interfering link 131.

In FIG. 1, the labels of transmitter or receiver do not exclude the possibility of other functionality in the devices. For example, in some embodiments, transmitters 101 and 102 may be part of wireless base stations that are capable of both transmission and reception. Similarly, in further embodiments, transmitters 101 and 102 may each comprise a small cell eNodeB (eNB). In still further embodiments, transmitters 101 and 102 may each comprise a Home eNB (HeNB). Receivers 111 and 112 may be user equipment (UEs) configured to receive downlink transmissions from respective eNBs.

Interference at receivers 111 and 112 results when transmissions from transmitters 101 and 102 occur at the same time on the same frequency. Such interference reduces network capacity. Transmitters 101 and 102 can coordinate their transmissions to mitigate harm caused by interference while still providing high data-rate transmissions to their respective receivers. This coordination can take place in time or in frequency.

The 3GPP Long Term Evolution (LTE) standard defines a frequency-domain type of coordination, labeled inter-cell interference coordination (ICIC), and a time-domain type of coordination, labeled enhance ICIC (eICIC). With eICIC, neighboring transmitters may coordinate to periodically transmit an almost-blank sub-frame (ABS), where a transmitter does not transmit on data traffic channels but may transmit on control channels at low power. When one transmitter sends an ABS, a receiver can theoretically receive transmissions on a traffic channel from a second transmitter without interference. It is desirable for transmitters to coordinate their ABS transmissions to maximize network throughput by avoiding a scenario where neighboring transmitters both send an ABS in the same sub-frame. This coordination could be performed through an expensive X2-type interface between the transmitters. In certain embodiments, however, no X2 interface is required for coordination of ABS transmissions. Avoiding the use of the X2 interface, and thereby enabling base stations to choose an ABS pattern without communicating with each other, reduces overhead and cost.

In an embodiment, receivers 111 and 112 may provide feedback to transmitters 101 and 102, respectively. This feedback may be in the form of a channel state information (CSI) report as allowed in the 3GPP LTE specification. The feedback may enable the transmitters 101 and 102 to schedule transmissions to the respective receivers 111 and 112 in frequencies or sub-frames having low interference.

Figure 2:
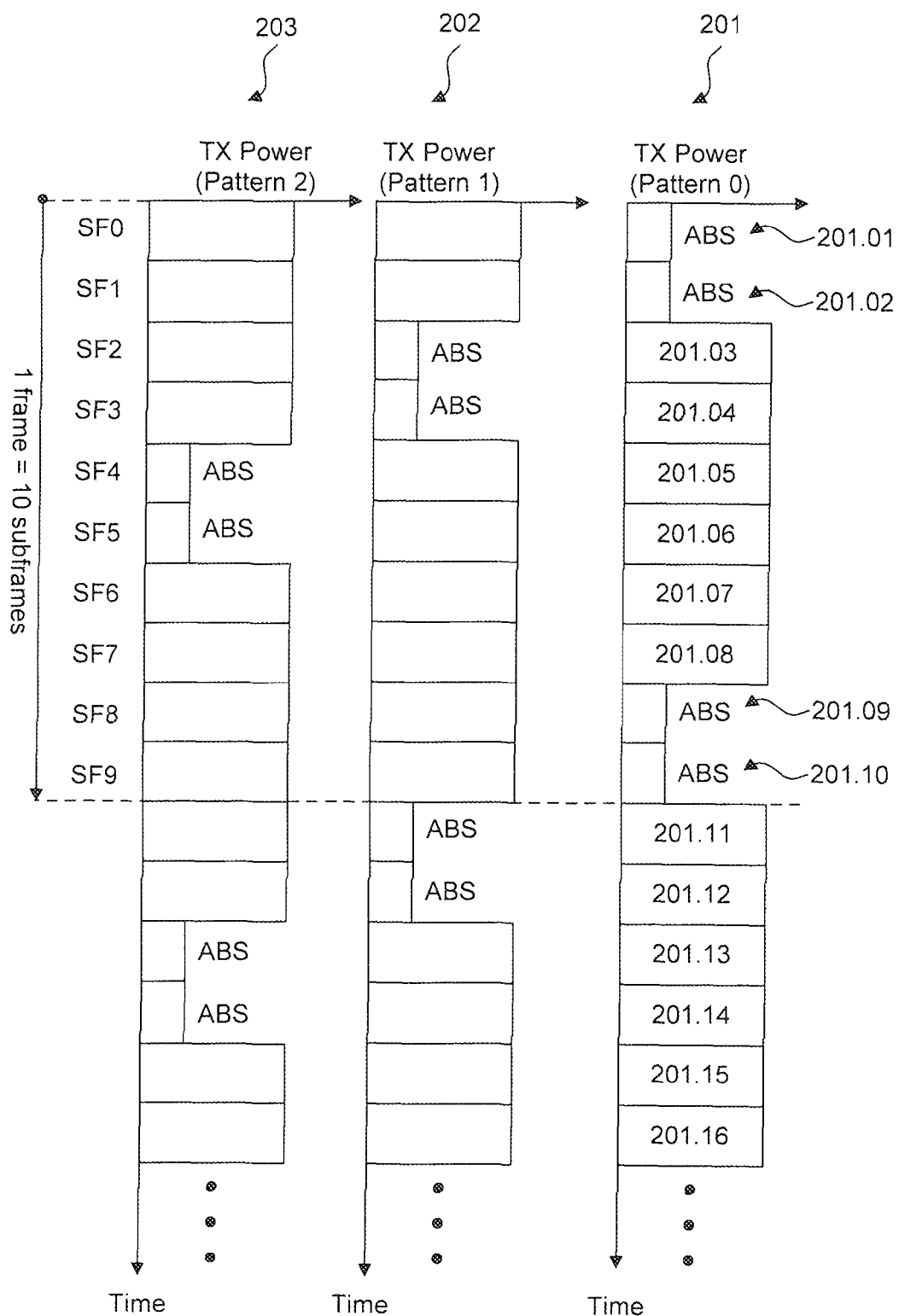
FIG. 2 illustrates three exemplary ABS patterns with periodicity of eight sub-frames and a frame size of ten sub-frames per frame.

FIG. 2 illustrates an exemplary set of three ABS patterns 201, 202, and 203. These patterns are provided as illustrative embodiments only. The present disclosure is not limited to a specific set of ABS patterns. The exemplary patterns are based on a frame comprising ten sub-frames. For example, focusing on Pattern 0 201, the first frame consists of ten sub-frames 201.01-201.10. In the first frame, four of the ten sub-frames are ABSs (i.e., 201.01, 201.02, 201.09, and 201.10). This ABS pattern 201 has a periodicity of eight sub-frames, meaning the ABS pattern repeats every eight sub-frames. Thus, in this embodiment, consecutive frames will not contain ABSs in identical time locations because there are 10 sub-frames in each frame. Accordingly, the second frame of this pattern 201, shown in part as comprising 201.11-201.16, does not have an ABS in its first two sub-frames 201.11 and 201.12.

Pattern 202 has the same periodicity as pattern 201 but is delayed in time relative to pattern 201 by two sub-frames. The result is that the ABSs of pattern 202 occur in the sub-frames immediately following the ABSs of pattern 201. In an embodiment, transmitters 101 and 102 adopt ABS patterns 201 and 202, respectively, such that their respective transmissions to receivers 111 and 112 may be received interference-free for at least two sub-frames of each frame, namely when the other transmitter is transmitting an ABS.

Pattern 203 also has the same periodicity as patterns 201 and 202, but is delayed in time relative to pattern 201 by four sub-frames, and relative to pattern 202 by two sub-frames. The result is that the ABSs of pattern 203 occur in the sub-frames immediately following the ABSs of pattern 202. Accordingly, if all three patterns are respectively adopted by adjacent transmitters, the three transmitters would take turns transmitting ABSs, with a two sub-frame period where all transmitters sent a full frame.

Figure 3:
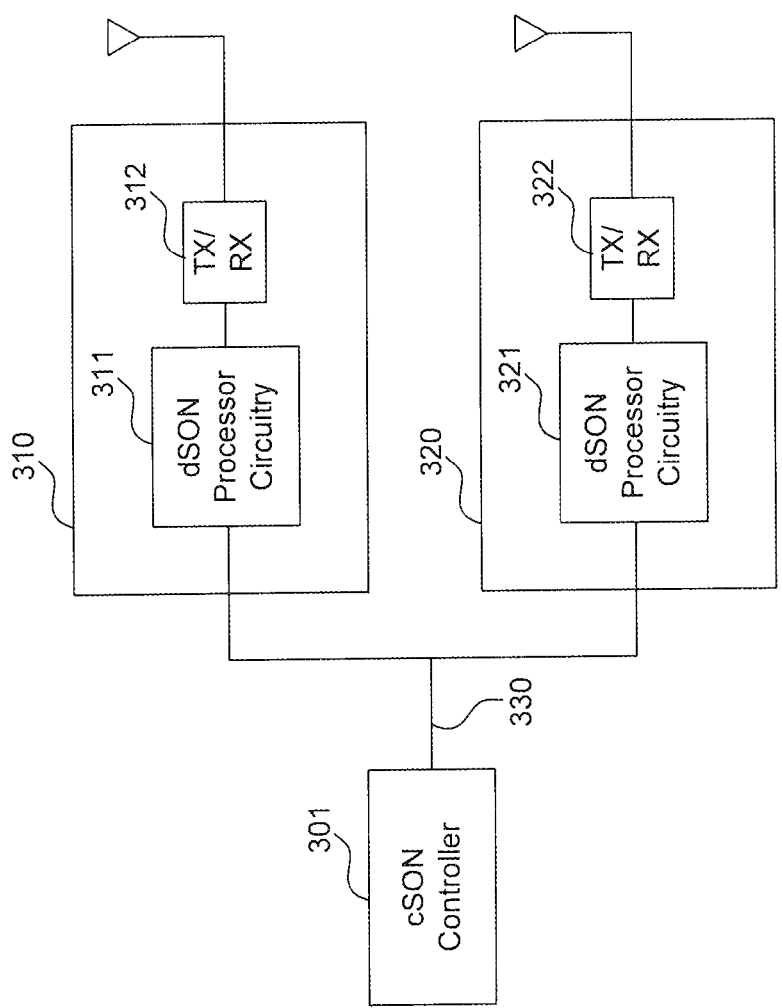
FIG. 3 illustrates an exemplary self-organizing network (SON) with a centralized SON controller and two distributed SON processor circuitry.

FIG. 3 illustrates an exemplary self-organizing network (SON) including centralized SON (cSON) controller 301 and base stations 310 and 320. The base stations 310 and 320 have respective distributed SON (dSON) processor circuitry 311 and 321 and respective transceivers 312 and 322. The segmentation between dSON processor circuitry 311, 321 and transceivers 312, 322 may be physical or logical. Base stations 310 and 320 may communicate with cSON 301 via a standard interface such as the S1 interface defined by the 3GPP LTE specification. Herein, base stations 310 and 320 are considered "neighboring" base stations herein, when they are operate in adjacent cells, OT when their respective transmit signal amplitude or signal power is greater than a predefined threshold when received at the other base station.

In an embodiment, the cSON controller 301 may provide a list of possible ABS patterns to each base station 310, 320. In another embodiment, the cSON 301 may additionally provide parameters that may aid the base stations 310, 320 to choose an ABS pattern in a distributed fashion without direct communication between base stations 310, 320. One challenge of choosing ABS patterns in a distributed fashion is to keep neighboring base stations from choosing the same ABS pattern. If neighboring base stations choose the same ABS pattern, then their ABS sub-frames will overlap, and neither base station will benefit from an interference-free sub-frame transmission.

In an embodiment of the disclosure, the base stations 310, 320 employ a modulo operation as part of choosing an ABS pattern. A modulo operation divides a first number by a second number and outputs the remainder of the first number divided by the second number as the modulus of the operation. For example, 13 modulo 4 equals 1 because 13/4 equals 3¼, or 3 with a remainder 1.

In an embodiment, the base stations 310, 320 have respective distinct physical cell IDs (PCIs). The PCIs may be determined by dSON processor circuitry during an initial configuration of the base stations. The dSON processor circuitry chooses a PI such that PCIs of neighboring base stations have a unique modulus relative to the number of possible ABS patterns. During initialization, the dSON can "sniff" upstream or downstream transmissions of neighboring cells to determine what PCIs are employed by neighboring base stations, which can aid the dSON in determining a suitable PCI for its own base station. For example, if there are three possible ABS patterns (as illustrated in FIG. 2), then the PCIs of neighboring base stations are preferably unique modulo-3, so that a division operation of each PCI by the number of ABS patterns will provide a unique remainder. In this manner, if base stations 310, 320 utilize the modulo value as an index to choose an ABS pattern, neighboring base stations will not choose the same ABS pattern. For example, a base station may have a PCI of 1, and 1 mod 3 equals 1. In an embodiment, that base station may choose ABS Pattern 1 in FIG. 2. Thus, a neighboring base station should have a PCI such that PCI mod 3 equals 0 or 2 so that the neighbor dSON processor circuitry chooses ABS pattern 0 or 2. Thus, base stations having PCI=3 and PCI=6 should not physically neighbor each other in the network because 3 mod 3 equals 0, and 6 mod 3 equals 0, and thus would choose the same ABS pattern.

In an embodiment, the dSONs 311, 321 can receive the list of ABS patterns that are indexed 0 to (r−1), and any provided parameters from the cSON 301. The dSONs 311, 321 can then separately select an ABS pattern from the provided list of ABS patterns using the base station's own PCI. Since the PCIs are preferably unique modulo-r, where r is the number of ABS patterns provided by the cSON 301, adjacent base stations will be able to choose different ABS patterns such that their ABSs will not overlap. The list of ABS patterns provided by the cSON 301 may be represented as a set of binary sequences, with a binary '0' representing a normal data sub-frame, and a binary '1' representing an ABS. FIG. 5 provides example binary sequences, or bit mappings, for illustrative purposes.

In another embodiment, the cSON 301 may provide parameters that allow the dSONs 311, 321 to derive a selected ABS pattern. This embodiment reduces the communication requirement between cSON 301 and dSONs 311, 321. For example, instead of providing a list of ABS patterns, the cSON 301 may provide parameters such as periodicity N, number of ABS patterns r (also termed the ABS list size), ABS repetition factor m, and offset $m_0$. The cSON 301 may provide the same parameters to neighboring base stations. From these parameters, the pattern may be illustratively defined as a length-N binary sequence with (m/r) consecutive 1's that begin at bit (m/r)*((PCI mod r)+$m_0$). For example, in FIG. 2, pattern 0 may be represented as '11000000,' pattern 1 may be represented as '00110000,' and pattern 2 may be represented as '00001100.' The ABS repetition factor m dictates the number of consecutive sub-frames an ABS pattern will be transmitted, whereas the periodicity is the number of sub-frames between consecutive ABS sub-frames. For example, all three patterns in FIG. 2 have an ABS repetition factor m=6 such that m/r=6/3=2 consecutive ABS sub-frames form part of each period, and a periodicity N=8. The distinguishing parameter between the three patterns in FIG. 2 is the offset $m_0$, which dictates the number non-ABS sub-frames that precede the first ABS sub-frame in the pattern. In FIG. 2, pattern 0 has an offset of 0, pattern 1 has an offset of 2, and pattern 2 has an offset of 4. FIGS. 7 and 8 provide example patterns derived from parameters N, r, m, and $m_0$.

Figure 4A:
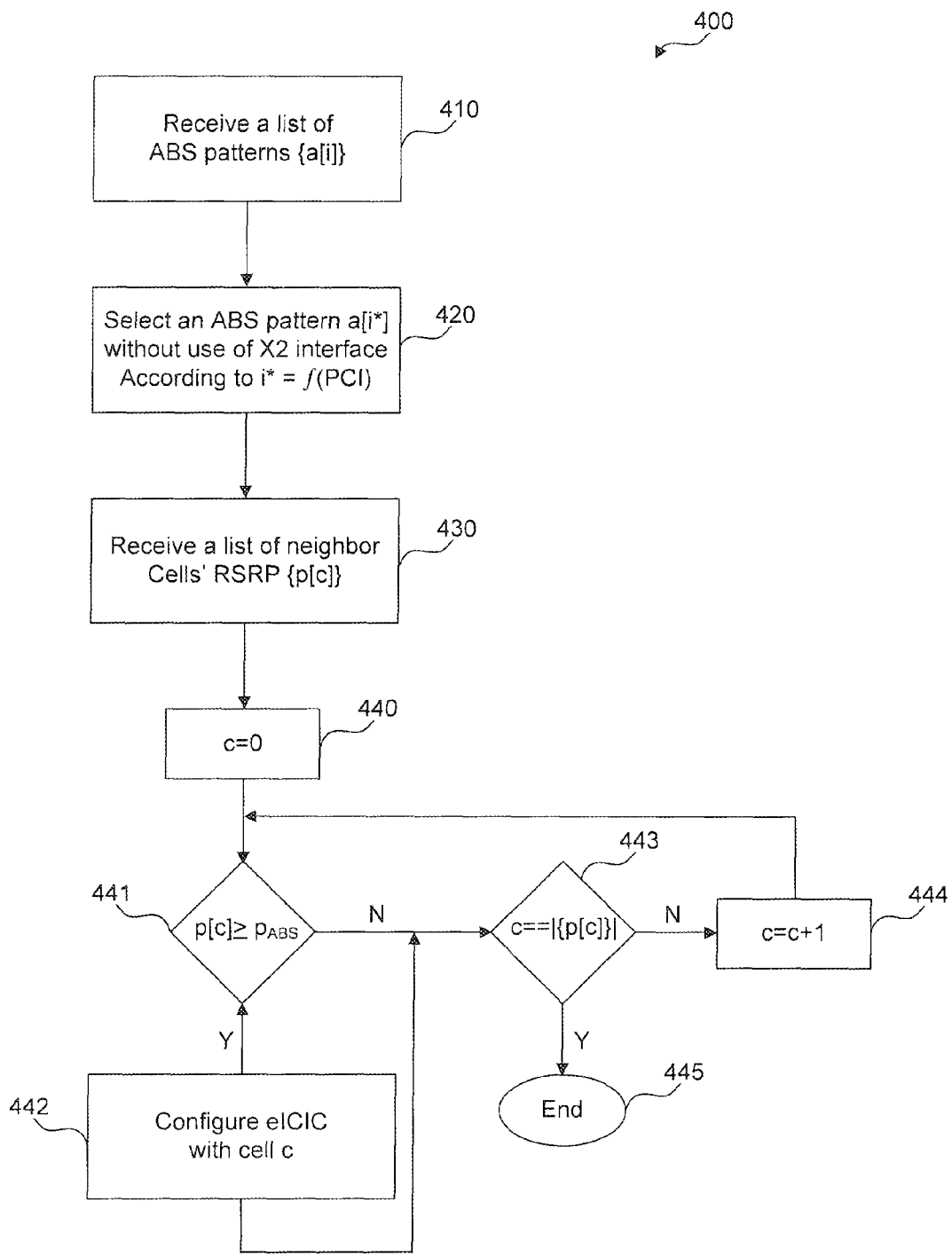
FIG. 4A is a flow chart of a method to configure enhanced inter-cell interference coordination (eICIC).

FIG. 4A is a flow chart of a method to configure enhanced inter-cell interference coordination (eICIC). Using FIG. 3 as an exemplary reference, the method may be implemented by the dSON processor circuitry 311, 321, or controlled by dSON processor circuitry 311, 321 using their respective transceivers. The method begins in block 410 by receiving a list of ABS patterns {a[i]}. That is, a[0] corresponds to pattern 0, a[1] corresponds to pattern 1, a[2] corresponds to pattern 2, etc. In some embodiments, block 410 may comprise reception of ABS parameters in addition to or instead of an express list of ABS patterns.

The method continues in block 420 with selection of an ABS pattern. In an embodiment, the selection is performed without the use of an X2 interface between neighboring base stations. In some embodiments, the selection is performed by selecting an index i* from the set {0, 1, . . . , r−1} via the selection function i*=ƒ(PCI). In an example embodiment, ƒ(PCI)=PCI mod r. The selection function ƒ may also be a function of parameters provided by the cSON 301.

Figure 4B:
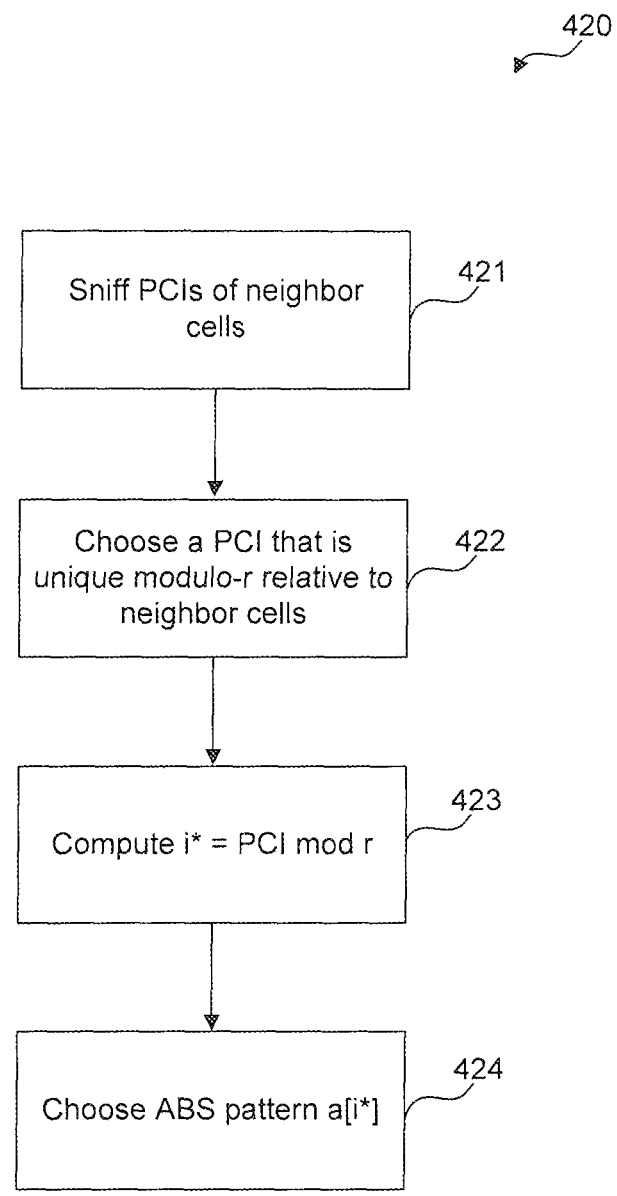
FIG. 4B is a flow chart of a method for selecting an ABS pattern based on a physical cell ID.

Step 420 is further illustrated in FIG. 4B. Referring to FIG. 4B, in step 421. PCIs of neighboring cells are "sniffed" by receiving signal transmissions associated with the neighboring base stations, and decoding their PCIs from the received signal transmissions. Herein, neighboring base stations are those having a transmit signal amplitude or power, which when received at the present base station, are equal-to or greater-than a predefined threshold. Next, in step 422, a PCI for the present base station is chosen that is unique modulo-r relative to those of neighboring base stations, where the parameter r represents the number of ABS patterns and may be provided by the cSON controller 301. More specifically, the PCI for the present base station is chosen such that the modulus of the PCI mod r function is different from those of neighboring base stations. In step 423, the dSON processor circuitry computes an index i* using the modulus of the PCI and r. That is, ƒ(PCI)=PCI mod r. In other words, the index i* is determined using the remainder of the PCI of the base station divided by r. The index i* can be the modulus of PCI mod r, or some offset from the modulus, or a function of modulus. In step 424, the dSON processor circuitry chooses the ABS pattern with index i*, which can include accessing a memory that stores the r-number of ABS patterns, and/or the parameters that define the ABS patterns. FIG. 6 provides an illustrative mapping between PCI and selected pattern number i* based on the modulus function and the parameter r.

Returning back to FIG. 4A, the method continues in block 430 by receiving a list of power metrics for neighboring cells. In an exemplary embodiment, the power metrics comprise neighboring cells' reference signal received power (RSRP) as a list {p[c]}. That is, p[0] is the RSRP for neighbor 0, etc. In an embodiment, the list of power metrics is provided by a radio environment measurement (REM) component of the base station. In a further embodiment, the list of power metrics for neighboring cells is sorted in descending order to allow for efficient processing with neighboring cells prioritized by the strength of their interference. In other embodiments, the list of power metrics for neighboring cells is not sorted. The remainder of the illustrated method makes no assumption on the order of the list of power metrics for neighboring cells.

Beginning in block 440, the list of power metrics for neighboring cells is analyzed to determine whether to configure eICIC with any neighboring cells. Specifically, eICIC may be most effective in balancing throughput with interference mitigation when applied to the strongest interferers. In block 440, an iterator index e is set to 0. In block 441, the power metric p[c] is evaluated to determine the suitability of neighboring cell c for eICIC. In an embodiment, power metric p[e] is an RSRP that is compared to a threshold value $p_{ABS}$, which is the minimum interference power level that warrants eICIC such that a base station begins transmitting according to an ABS pattern.

If the RSRP p[c] exceeds $p_{ABS}$, then the method proceeds to block 442 and configures eICIC with cell c. In an embodiment, configuration of eICIC comprises configuring dual channel quality information (CQI) reporting for UEs in the coverage area of the base station performing the present method. The dual CQI reporting may be an asynchronous mode where the base station prompts a UE to report CQI for neighboring cell c according to its PCI. The dual CQI reporting may be as specified in the 3GPP LTE specification. In further embodiments, CQI measurements for a given cell may be performed in sub-frames where an adjacent cell configured for eICIC is transmitting an ABS. The dual CQI reporting may enable the base stations to schedule transmissions to receivers with severe interference on sub-frames where the interfering cells transmit an ABS.

After eICIC is configured for cell c in block 442, or if the power metric p[c] does not exceed $p_{ABS}$ in block 441, the iterator index c is incremented in block 444 unless c=|{p[c]}| as shown in block 443, meaning that all cells have been evaluated. In this case, the method ends in block 445. In some embodiments, all or parts of the disclosed methods may be re-executed to evaluate changes in network configurations or propagation conditions. In further embodiments, the entire list of power metrics {p[c]} need not be evaluated in full, for example when the list is sorted in descending order. In the latter exemplary case, the method may terminate immediately after any power metric fails to exceed the eICIC threshold $p_{ABS}$. In some embodiments, neighbor cells that do not qualify for eICIC may qualify for conventional ICIC as defined in the 3GPP LTE specification. Conventional ICIC does not include ABS patterns and only coordinates interference in the frequency domain. Accordingly, the disclosed methods are compatible with performing eICIC with some neighboring cells and conventional ICIC with others.

FIG. 5 illustrates an exemplary list of ABS patterns. In the illustrated list, there are r=3 patterns with periodicity N=8. Each bit in a bit sequence represents a sub-frame transmission, with a binary '1' representing an ABS, and a binary '0' representing a normal sub-frame transmission. The present disclosure is compatible with any ABS pattern, including those patterns that are allowed by the 3GPP LIFE specification. For example, the 3GPP LTE specification allows for ABS patterns with N less than or equal to 40.

FIG. 6 illustrates an exemplary mapping of a base station's PCI to an ABS pattern number based on parameter r. Specifically, in the illustrated embodiment, the ABS pattern selection function $f(PCI)=PCI \mod r$. In a preferred embodiment, neighboring base stations have unique PCIs modulo r. The PCI for a given base station may be determined by the dSON processor circuitry during initial configuration based on knowledge of neighboring PCIs obtained by various known methods according to the 3GPP LTE specification. In an exemplary embodiment, base stations may directly report their PCIs to each other using a standard interface.

FIG. 7 illustrates an exemplary list of ABS patterns that may be generated directly from ABS parameters provided by cSON 301. In the illustrated example, there are r=3 patterns with periodicity N=8. The patterns each have (m/r)=1 consecutive ABSs with an offset of $m_0=0$. In the exemplary embodiment, $f(PCI)=PCI \mod r$, but the ABS pattern list is not expressly provided by cSON 301. Rather, parameters N, r, m, and m0 are provided such that a dSON processor circuitry 311, 321 may derive its own ABS pattern without necessarily storing or having express knowledge of other possible ABS patterns. In some embodiments, (m/r) is not necessarily an integer, in which case the floor function may be employed.

FIG. 8 illustrates a further exemplary list of ABS patterns that may be generated directly from ABS parameters provided by cSON 301. In the illustrated example, there are r=4 patterns with periodicity N=12. The patterns each have (m/r)=12/4=3 consecutive ABSs with an offset of $m_0=1$. In this embodiment, the parameter m may be termed a repetition factor, and an offset of $m_0$ shifts the ABSs to the right by $(m/r)*m_0$ sub-frames.

Figure 9:
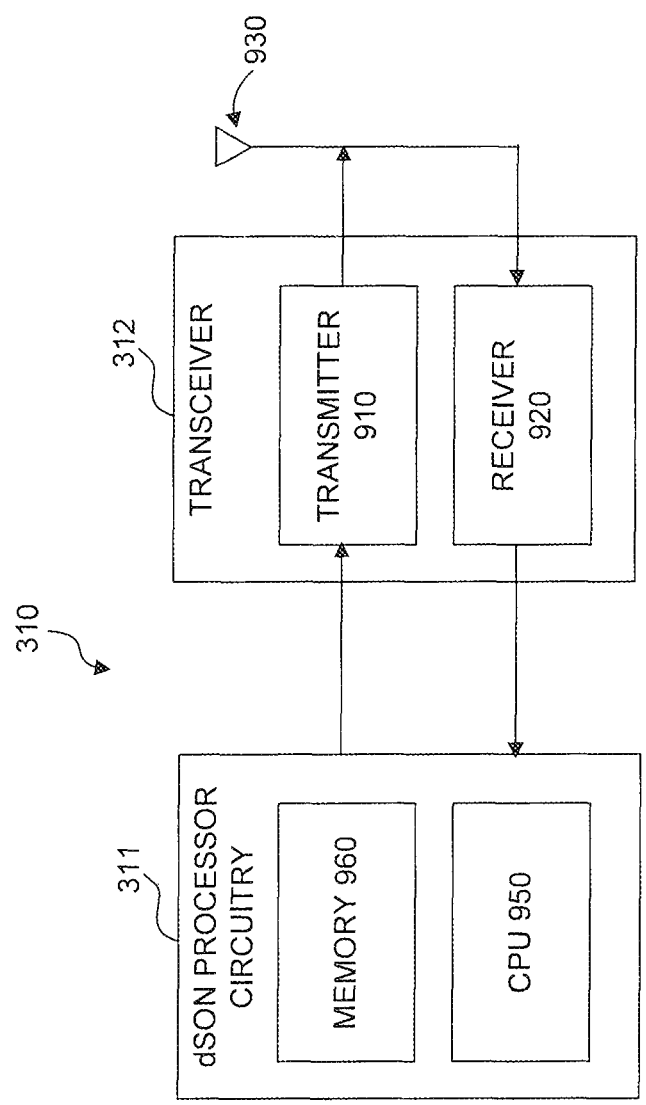
FIG. 9 illustrates a transmitter according to an exemplary embodiment of the present disclosure.

FIG. 9 illustrates the base station 310 according to an exemplary embodiment of the present disclosure. For example, the base station 310 can include a transceiver 312 communicatively coupled to dSON processor circuitry 311. The transceiver 312 includes one or more processors, circuitry, and/or logic that is configured to transmit and/or receive wireless communications via one or more wireless technologies. In particular, the transceiver 312 can include a transmitter 910 and a receiver 920 that have one or more processors, circuitry, and/or logic configured to transmit and receive wireless communications, respectively, via one or more antennas 930. Those skilled in the relevant art(s) will recognize that the transceiver 312 can also include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 930 may include an integer array of antennas, and that the antenna 930 may be capable of both transmitting and receiving wireless communication signals. For example, the base station 310 can be configured for wireless communication utilizing a Multiple-input Multiple-output (MIMO) configuration.

In an exemplary embodiment, the transceiver 312 is configured for wireless communications conforming to one or more wireless protocols defined by 3GPP. For example, the transceiver 312 is configured for wireless communications conforming to 3GPP's LTE specification. In this example, the transceiver 312 can be referred to as LTE transceiver 312. Those skilled in the relevant art(s) will understand that the transceiver 312 is not limited to communication conforming to 3GPP's LTE specification, and can be configured for communications that conform to one or more other 3GPP protocols and/or one or more non-3GPP protocols. It should be appreciated that the transceiver 312 can be referred to by one or more other 3GPP and/or non-3GPP protocols in embodiments where the transceiver 312 is configured for such other communications conforming to the other 3GPP and/or non-3GPP protocols.

The transmitter 910 in the transceive 312 can be controlled by the dSON processor circuitry 311 to transmit wireless signals to one or more recipient mobile devices (also called "user equipment," or "UE," in LTE), including the transmission of wireless signals with transmit frames that are formatted according to the ABS patterns described herein. Likewise, the receiver 920 can receive wireless signals transmitted from the UEs, including UEs that are being serviced by other neighbor base stations. Accordingly, the receiver 920 can be controlled by the dSON processor circuitry 311 to scan frequencies, in-use by neighbor base stations, to receive their associated wireless signals (e.g. "sniff") for the purpose of decoding the $PCI_N$ of each neighbor base station, so the proper PCI can be selected for the present base station.

The dSON processor circuitry 311 can include one or more processors (CPUs) 950 and/or circuits configured to carry out instructions to perform arithmetical, logical, and/or input/output (I/O) operations of the base station 310 and/or one or more components of the base station 310. The dSON processor circuitry 311 can further include a memory 960 that stores data and/or instructions, where when the instructions are executed by the processor(s) 950, perform the functions described herein. The instructions, stored in memory 960 and performed by processors 950, can include at least portions of the algorithm described in FIGS. 3, 4A, and 4B as described herein. The data stored in memory 960 can include the ABS patterns in list form, and their corresponding parameters that define the ABS patterns. The memory 960 can be any volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 960 can be non-removable, removable, or a combination of both.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A base station apparatus for a base station, the base station apparatus comprising:
   a transceiver configured to perform wireless communications, wherein the transceiver includes a receiver configured to receive wireless signals associated with a neighbor base station; and
   processor circuitry configured to:
      receive r-number of almost blank sub-frame (ABS) patterns;
      select an ABS pattern from the r-number of ABS patterns using a physical cell identification (PCI) of the base station, wherein the selection is based on a modulus resulting from PCI mod r to identify an index of the selected ABS pattern in the r-number of ABS patterns; and
      control a transmitter in the transceiver to transmit wireless signals according to the selected ABS pattern;
   wherein the modulus resulting from PCI mod r is different from a second modulus resulting from $PCI_N$ mod r of the neighbor base station, wherein $PCI_N$ is a PCI of the neighbor base station; and
   wherein to select the ABS pattern from the r-number of ABS patterns, the processor circuitry is further configured to:
      determine the $PCI_N$ of the neighbor base station based on the received wireless signals associated with the neighbor base station;
      calculate the second modulus of the neighbor base station based on $PCI_N$ mod r;
      select the PCI of the base station so that the modulus resulting from PCI mod r is different from the second modulus; and
      calculate the modulus of the base station based on PCI mod r to identify the index.

2. The base station apparatus of claim 1, wherein the r-number of ABS patterns are received by both the base station and the neighbor base station from a centralized controller.

3. The base station apparatus of claim 1, wherein the processor circuitry selects the ABS pattern from the r-number of ABS patterns without direct communication with the neighbor base station.

4. The base station apparatus of claim 1, wherein each ABS pattern of the r-number of ABS patterns defines a location of one or more ABS in a transmit frame, wherein during each ABS the base station is precluded from transmitting the wireless signals on data traffic channels.

5. The base station apparatus of claim 1, further comprising a memory that stores the r-number of ABS patterns and stores associated parameters of the r-number of the ABS patterns, each ABS pattern and its associated parameters having a corresponding index to identify the ABS pattern in the memory.

6. The base station apparatus of claim 1, wherein the transceiver is configured to perform the wireless communications according to a Long Term Evolution (LTE) protocol.

7. A method, performed by a base station, of selecting an almost blank sub-frame (ABS) pattern for wireless transmission by the base station, the method comprising:
   receiving a list of r-number of ABS patterns;
   selecting an ABS pattern from the r-number of ABS patterns using a physical cell identification (PCI) of the base station, wherein the selection is based on a modulus resulting from PCI mod r to identify an index that corresponds to the selected ABS pattern in the list of the r-number of ABS patterns, wherein the modulus resulting from PCI mod r is different from a second modulus resulting from $PCI_N$ mod r of a neighbor base station, wherein $PCI_N$ is a PCI of the neighbor base station; and
   transmitting wireless signals according to the selected ABS pattern;
   wherein the selecting comprises:
   determining the $PCI_N$ of the neighbor base station based on received wireless signals associated with the neighbor base station;
   calculating a second modulus of the neighbor base station based on $PCI_N$ mod r;
   selecting the PCI of the base station so that the modulus resulting from PCI mod r is different from the second modulus; and
   calculating the modulus of base station based on PCI mod r to identify the index.

8. The method of claim 7, further comprising retrieving, using the index, parameters associated with the selected ABS pattern from a memory, the parameters defining the transmitted wireless signals according to the selected ABS pattern.

9. The method of claim 7, wherein transmitting wireless signals comprises forming a transmit frame having data sub-frames and one or ore ABS that are distributed among the data sub-frames according to the selected ABS pattern, wherein a location of the one or more ABS in the transmit frame does not overlap in time with any ABS of the neighbor base station.

10. The method of claim 7, wherein the r-number of ABS patterns are received by both the base station and the neighbor base station from a centralized controller.

11. The method of claim 7, wherein the selected ABS pattern is determined without direct communication with the neighbor base station.

12. The method of claim 7, wherein each ABS pattern of the r-number of ABS patterns defines a location of one or more ABS in a transmit frame, wherein during each ABS of the selected ABS pattern the base station is precluded from transmitting the wireless signals on data traffic channels.

13. The method of claim 7, wherein the index is the modulus.

14. The method of claim 7, wherein the index is a function of the modulus.

15. A method, performed by a base station, of selecting an almost blank sub-frame (ABS) pattern for wireless transmission by the base station, the method comprising:

receiving a list of r-number of ABS patterns;

receiving wireless signals associated with a neighbor base station;

determining a physical cell identification of the neighbor base station ($PCI_N$) based on the received wireless signals associated with the neighbor base station;

calculating a first modulus of the neighbor base station based on $PCI_N$ mod r, wherein r is a total number ABS patterns available for selection by the base station and the neighbor base station;

selecting a physical cell identification (PCI) for the base station so that a second modulus resulting from PCI mod r is different from the first modulus;

calculating the second modulus of the base station based on PCI mod r to identify an index; and selecting an ABS pattern for use by the base station by using the index to access the list of r-number of ABS patterns.

16. The method of claim 15, further comprising:

transmitting wireless signals according to the selected ABS pattern, including forming a transmit frame having data sub-frames and one or more ABS that are distributed among the data sub-frames according to the selected ABS pattern, wherein a location of the one or more ABS in the transmit frame does not overlap in time with any ABS of the neighbor base station.

17. The method of claim 15, further comprising retrieving, using the index, parameters associated with the selected ABS pattern from a memory, the parameters defining the transmitted wireless signals according to the selected ABS pattern.

18. The method of claim 15, wherein the selected ABS pattern is determined without direct communication with the neighbor base station.

19. The method of claim 15, wherein each ABS pattern of the r-number of ABS patterns defines a location of one or more ABS in a transmit frame, wherein during each ABS of the selected ABS pattern, the base station is precluded from transmitting the wireless signals on data traffic channels.

20. The method of claim 15, wherein the r-number of ABS patterns are received by the base station from a centralized controller.

* * * * *

UNITED STATES PATENT AND TRADEMARK OFFICE
CERTIFICATE OF CORRECTION

PATENT NO. : 9,894,528 B2
APPLICATION NO. : 14/926237
DATED : February 13, 2018
INVENTOR(S) : Chiu et al.

It is certified that error appears in the above-identified patent and that said Letters Patent is hereby corrected as shown below:

In the Specification

In Column 4, Line 56, replace "PI" with --PCI--.
In Column 6, Line 53, replace "index e" with --index c--.
In Column 6, Line 56, replace "p[e]" with --p[c]--.
In Column 7, Line 35, replace "LIFE" with --LTE--.
In Column 8, Line 1, replace "parameter in" with --parameter m--.
In Column 8, Line 45, replace "transceive" with --transceiver--.
In Column 10, Line 63, replace "or ore" with --or more--.

Signed and Sealed this
Fourth Day of June, 2019

Andrei Iancu
*Director of the United States Patent and Trademark Office*